Aug. 26, 1952     A. J. MILLER ET AL     2,608,212
SELECTOR VALVE MECHANISM
Filed June 21, 1946     3 Sheets-Sheet 2
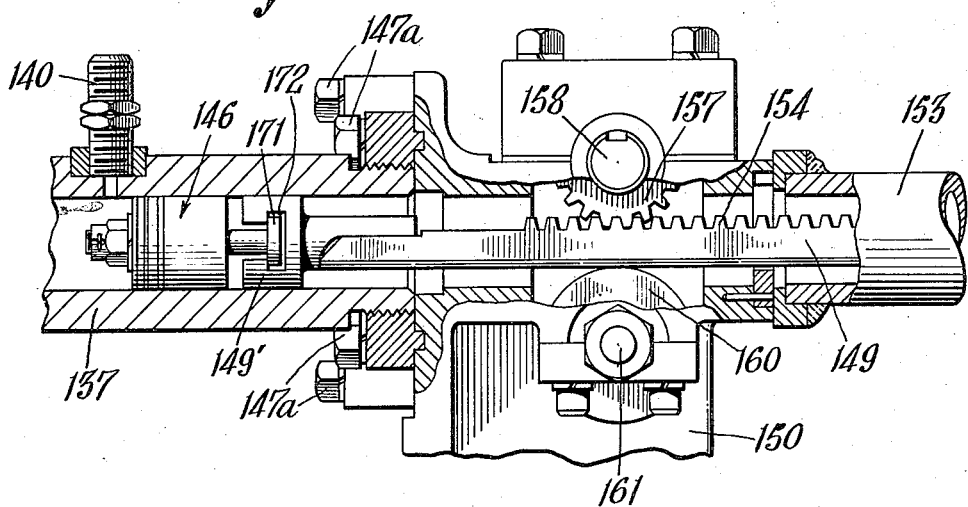
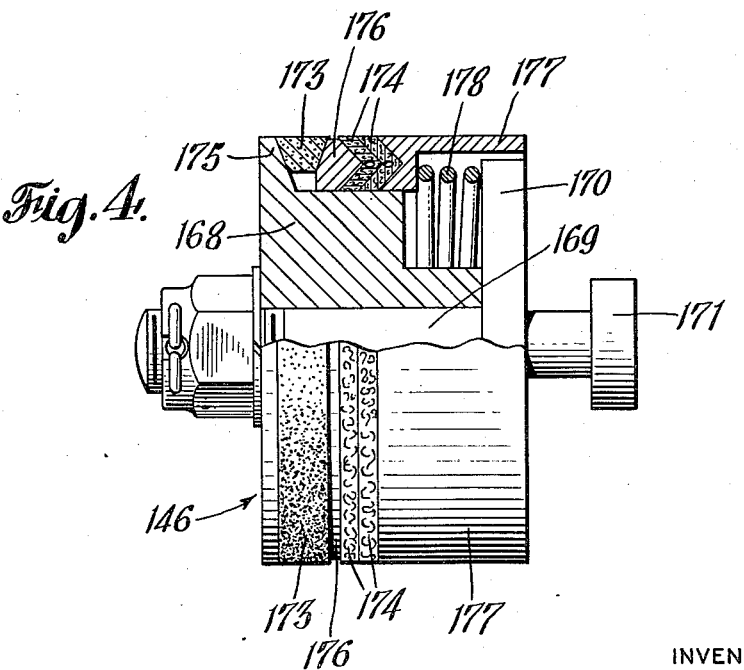
INVENTORS
ALFRED J. MILLER
WILLIAM C. WEIDNER
JOHN KOLODY
BY
ATTORNEY

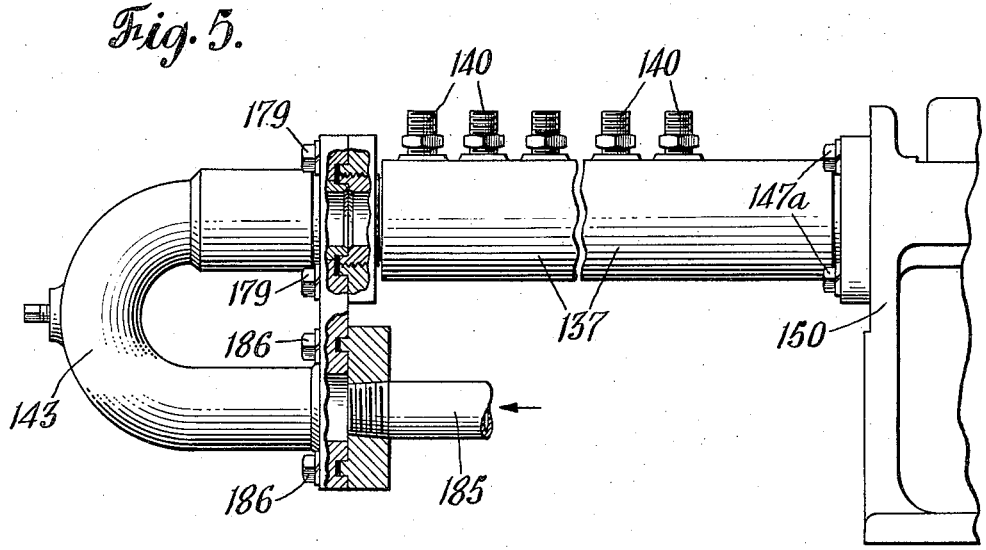
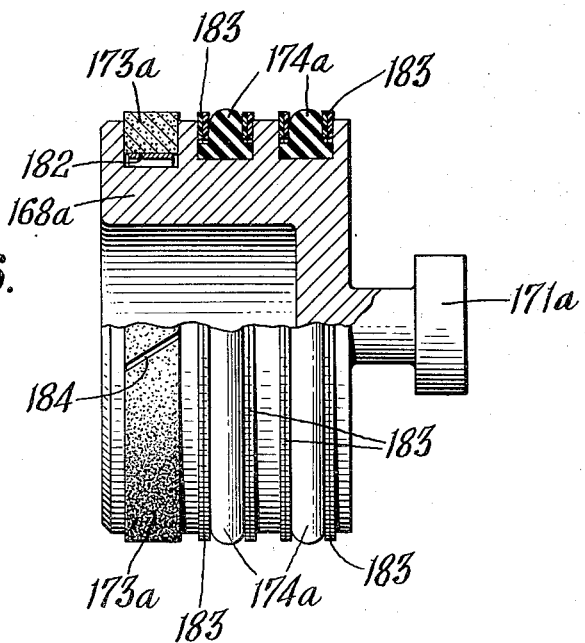

Patented Aug. 26, 1952

2,608,212

UNITED STATES PATENT OFFICE 2,608,212

SELECTOR VALVE MECHANISM

Alfred J. Miller, Garwood, William C. Weidner, Cranford, and John Kolody, Basking Ridge, N. J., assignors, by mesne assignments, to Union Carbide and Carbon Corporation, a corporation of New York Application June 21, 1946, Serial No. 678,396

16 Claims. (Cl. 137—595)

This invention relates to a selector valve mechanism for use in an apparatus for thermochemically conditioning or desurfacing metal bodies such as billets and the like and has for an object to provide a mechanism of this sort capable of holding pressure better. Another object is to provide an improved piston valve for such a device in which there is a reduction in the tendency for the piston to seize or stick to the cylinder wall. A further object is to provide a device of this sort which is adapted to arrest the passage of a backfire flame should any accidentally occur. Yet another object is to provide such a piston valve in which the occurrence of a backfire or flashback will not injure the piston packing or sealing material. Still another object is to provide a selector valve mechanism in which precautions are taken to avoid the possibility of an explosive mixture forming in event either fuel gas or oxygen should leak past its piston.

In our prior application Serial No. 477,984, filed March 4, 1943, for Machine for Surface Conditioning Metal Bodies, now Patent 2,429,326, dated October 21, 1947, of which this case is a continuation-in-part, is disclosed an improved selector valve mechanism.

An apparatus for thermochemically desurfacing billets requires oxygen to burn the metal surface and a fuel gas such as acetylene for preheating the work to its kindling temperature. A selector valve mechanism controls the number of nozzle openings supplied, depending on the size of the work. The cylinder and piston valve for the oxygen may not have oil for lubrication because of the danger of combustion of the oil. This absence of lubrication has made the operation of such a cylinder valve troublesome due to the danger of the sliding parts sticking or seizing. The attainment of adequate lubrication as well as the ability to get a tight enough fit to hold pressure without excessive friction and danger to seize has heretofore been a problem.

According to this invention these difficulties have been overcome. A carbon ring pressed radially outward into contact with the cylinder wall produces sufficient lubrication without oil and at the same time is adapted to function as a flash arrester to protect a more pliable packing strip from injury in event a backfire flame reaches the piston valve. To provide easy access for servicing such a piston valve it is readily demountable so that the piston may be removed from the cylinder.

Fig. 3 is a longitudinal section through one of the piston selector valve mechanisms and its rack and pinion operating device;

Fig. 4 is a longitudinal section through the piston of Fig. 3;

Fig. 5 is a longitudinal section showing the gas supply connection to a cylinder manifold; and Fig. 6 is a longitudinal section through another or modified form of piston.

Figure 1:
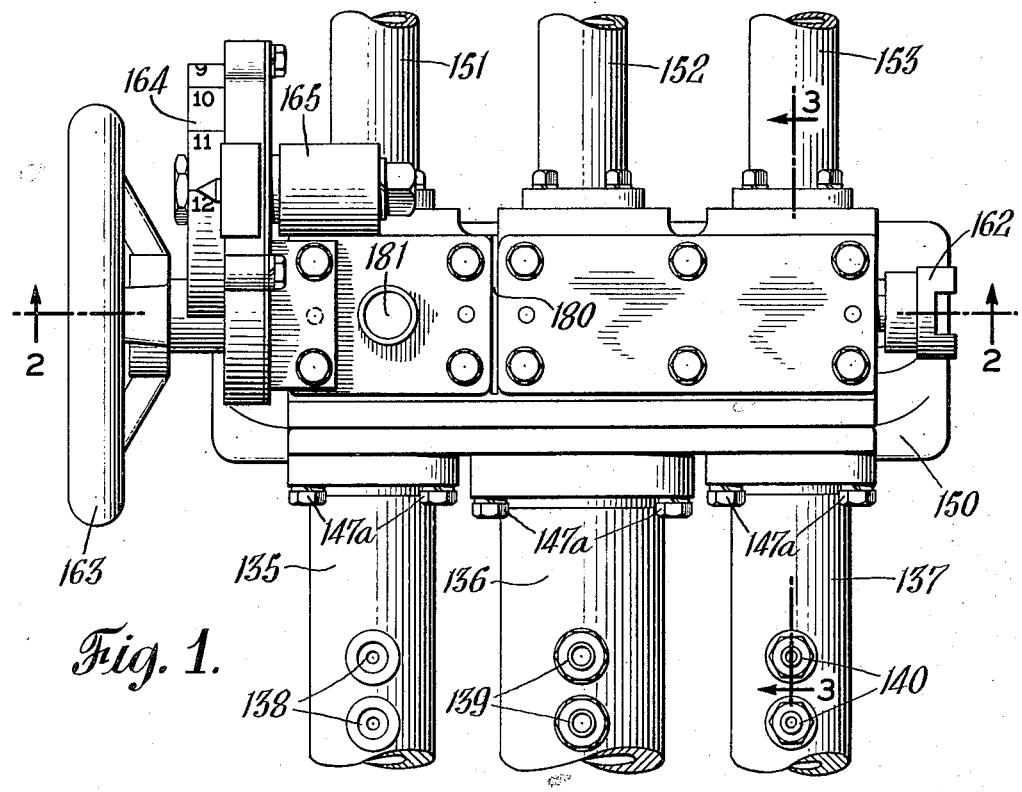
Fig. 1 is a top plan view of a selector valve mechanism embodying this invention.

The details of one embodiment of the improved selector valve mechanism are shown in the accompanying drawings in which there are provided three cylinder manifolds 135, 136 and 137, the manifold 135 being for the acetylene or fuel gas, manifold 136 for the desurfacing or cutting oxygen and manifold 137 for the preheat oxygen. When postmixed nozzles are used only two such manifolds are necessary. Each manifold is provided with a row of nipples 138, 139 and 140 for connecting the outlets of the tubing leading to the gas outlet orifices in the desurfacing heads. Each cylinder manifold is provided with a piston 146 of the type shown in Figs. 3 and 4, each of which gas tightly closes its cylinder against egress of gas to the respective outlet nipples. Each piston 146 is actuated by a rack bar in the manner shown in Figs. 2 and 3, there being three rack bars 147, 148 and 149. These bars pass through a frame 150 on one side of which the manifolds 135, 136 and 137 are secured. The rack bars 147, 148 and 149 are enclosed by tubular housings 151, 152 and 153, respectively. The rack bars have upwardly extending teeth 154 which mesh with the pinions 155, 156 and 157 shown in Fig. 2 as being keyed to a transverse shaft 158.

This shaft 158 is journalled in bearings 159 of the frame 150. For each rack bar there is a supporting roller 160 mounted on a stud 161 secured to the frame 150. The rollers 160 maintain the rack bars in mesh with their respective pinions. Instead of the rollers 160 some appropriate type slide bearing support may be used for each rack bar. One end of the shaft 158 extends externally of the frame 150 and is keyed to one half of a clutch 162, the other half of which is driven by a flexible shaft in the manner described in the aforementioned parent application. Each clutch 162 has a removable key whereby upon its engagement a selector valve may be manually operated by the hand wheel 163 shown as being located at the left side of Figs. 1 and 2, opposite to the clutch 162. The shaft 158 is also geared to an indicator drum 164 which has circumferential marks thereon, indicating the number of nipples 138, 139 and 140 which are in open communication with their respective manifolds, and thereby shows the number of main desurfacing oxygen orifices and their accompanying preheat orifices that are in operation. The drum 164 is rotatably mounted on a bracket 165 and is secured to a gear 166 that meshes with a pinion 167 keyed to the shaft 158. When the shaft 158 is turned either by the flexible shaft connected to the clutch 162 or by the hand wheel 163, the pinions 155, 156 and 157 will simultaneously move the rack bars 147, 148 and 149 and the pistons 146 engaged thereby to close the proper number of manifold outlets. At the same time the drum 164 will be rotated to indicate the number of main gas outlet orifices that have been cut off and to show whether the pistons are accurately positioned with respect to the manifold outlets.

Each of the pistons 146, as shown in Figs. 3 and 4, preferably comprises a body 168 having a retaining member 169 secured centrally thereof, which retaining member has a disc-like collar 170 on the rack bar side of the body 168. Beyond the collar 170 the member 169 has a T-shaped headed extension 171 which detachably engages the retaining slot 172 in the end of the rack bar 149 at a right angle to the cylinder axis. The seal between each manifold and the piston slidable therein, is provided by a main packing ring 173 having a trapezoidal cross section and two chevron-shaped packing rings 174 of some pliable material such as a rubber composition. The ring 173 is secured between the flange 175 on head 168 and a ring 176. The rings 174 are secured between the ring 176 and an annular axially slidable skirt 177. To hold the skirt 177 and to provide constant compression on the rings 174 and 173, a spring 178 is provided, acting between a shoulder of the sleeve 177 and the collar 170. The angle of the sides of ring 173 and the cooperating sides of flange 175 and ring 176 is suitable to give ring 173 an outward thrust, making it expansible. Securing bolts 147a, hold the cylindrical manifolds 135, 136 and 137 to their respective supports.

Gas under pressure is supplied to the opposite or left end of each of the cylinder manifolds 135, 136 and 137 by a U-shaped connection 143 as shown in Fig. 5 between the cylinder manifold 137 and the gas supply pipe 185. Bolts 179 secure the flanges on the connection 143 and manifold 137 while similar bolts 186 secure the flanges illustrated on the connection 143 and gas supply pipe 185. To withdraw the piston 146 from the cylinder manifold 137, bolts 179 and 186 are removed to remove the connection 143 from the end of the manifold 137. With the gas supply end of the manifold thus open, the rack bar is actuated to slide the piston to an extreme position out of the manifold when the piston 146 is quickly disconnected from the enlarged extension 149' of the rack bar by sliding the piston transversely of its axis along the slot 172. After its removal the piston may be examined or serviced and the same or another piston replaced as a unit.

The ring 173 is preferably of carbon impregnated with a metal such as cadmium for purposes of increasing its strength, reducing porosity, increasing the life of the ring 173 under the wearing conditions of use, and making the ring function as a backfire arrester in event any backfire flame on the gas delivery or left side of the piston in Figs. 3 and 4 reaches the ring 173. Should that happen the flame is arrested by this ring and kept from damaging the flexible packing strips or rings 174. Another function of the ring 173 is its ability to lubricate the opposed surfaces of the piston and cylinder wall without the use of the usual hydrocarbon lubricant. This last advantage is particularly desirable where oxygen under pressure is controlled. Previous to the present invention there was a tendency for the piston body sliding in the cylinder manifold to seize or stick, whereas now that tendency is eliminated by the carbon ring 173 providing just enough lubricant.

Fig. 6 shows a modified piston having a body portion 168a, a headed extension 171a and an expansible ring 173a of carbon preferably impregnated with cadmium or some other metal for the purposes mentioned in connection with the carbon ring 173 in Fig. 4. The ring 173a is split at 184 and provided with an expander 182 to urge the ring radially outwardly against the cylinder wall. The more pliable packing rings 174a are of rubber composition or other appropriate packing material. As shown these rings are of general T-shape rounded transversely on their periphery to provide a seal with the cylinder wall. Retaining rings 183 of a phenolic condensation product or other plastic stiffer than the packing, assist in holding the rings 174a in position. Such rings 183 are made by the manufacturer of the packing rings 174a.

When the ordinary premixed type of blowpipe is used, three cylinder manifolds 135, 136 and 137 are required, that numbered 135 being for the fuel or acetylene, manifold 136 for the cutting or desurfacing oxygen and that designated 137 being for the preheating oxygen. The cutting oxygen pressure in the manifold 136 may be between 25 to 60 p. s. i. The fuel or acetylene is usually under pressure of not over 15 p. s. i. The preheat oxygen for the usual premixed nozzle may have a lower pressure of around 6 or 7 p. s. i. When postmixed type desurfacing or conditioning nozzles are used then only two cylinder manifolds are needed, one for oxygen and the other for fuel, the oxygen being under a lower pressure for preheating purposes than for desurfacing operation. The preheat oxygen for a postmixed nozzle may have a pressure of say ½ p. s. i.

Figure 2:
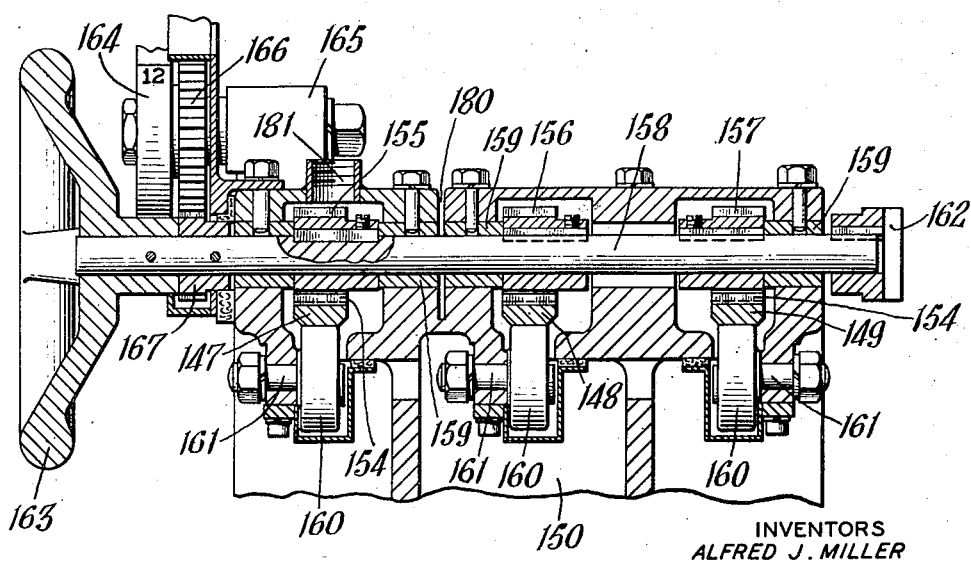
Fig. 2 is a vertical section on the line 2—2 of Fig. 1.

In event that gas should leak past one or more of the pistons, the tubular housings around the supporting rollers 160 are enclosed only enough to keep out dust and dirt and not for retaining any substantial gas pressure as shown in Fig. 2. However, if the fuel and desurfacing oxygen pistons should both leak, then to prevent the possibility of an explosive mixture being formed by gas passing through the bearing 159 between the fuel and oxygen housing, two safety precautions are used. One such comprises the provision of a vent 181 for the acetylene so that it may leak from its housing 151 into a safe area in the atmosphere. A second precaution is taken in case the vent 181 might become accidentally clogged and this involves the provision of a slot 180 in the bearing separating the fuel and oxygen housings (see Figs. 1 and 2), such slot in effect makes the single bearing 159 into two parts so that gas from either housing 152 and 151 will leak to the atmosphere through the slot 180 rather than pass into the other housing.

Among the advantages of this invention may be mentioned the adaptibility of the ring 173 to lubricate not only the piston and its skirt portion 177 which slides in the cylinder manifold but also the enlarged extension 149' on the rack bar which also slides in the cylinder 137. Without the ring 173 possessing this lubricating function there would be a tendency for the piston 146 or the extension 149', or both, to stick or seize since the usual hydrocarbon lubricant cannot be used in a cylinder containing oxygen under pressure.

We claim:

1. A selector valve mechanism in apparatus for thermochemically conditioning the surface of billets and the like, said mechanism comprising in combination a cylinder, a plurality of passages longitudinally spaced along said cylinder, a piston in the cylinder longitudinally shiftable for covering and uncovering some of said passages, means for supplying gas under pressure to one end portion of said cylinder, said piston comprising a body portion, a deformable packing ring carried by said body portion for engaging said cylinder, a second packing ring carried by said body portion of the piston between said deformable packing ring and the gas pressure end of said piston, and means between said second packing ring and piston body portion for urging said second packing ring radially outward into contact with said cylinder, said second packing ring being of carbon and of the self-lubricating type whereby the piston is lubricated and the second packing ring is adapted to shield the deformable packing ring against the impact of a surge of gas and whereby said cylinder and piston are adapted for use with either oxygen or fuel gas as the gas under pressure.

2. Mechanism according to claim 6 in which said second mentioned packing ring of carbon is impregnated with a metal to enhance its wear resisting character.

3. A selector valve mechanism for a thermochemical surface conditioning apparatus comprising in combination a cylinder, longitudinally spaced passages connected to said cylinder, a piston movable in said cylinder for the control of fluid flow through said passages, a slidable rod actuating said piston through an end of said cylinder, a detachable connection between said rod and piston, and a detachable gas pipe connection at the end of the cylinder away from that through which said rod is movable, the pipe connection at such end of said cylinder being removable and the piston being movable out of that end of the cylinder, the piston being movable laterally of its axis for disconnection from its actuating rod for inspection and replacement, said detachable connection between the rod and piston comprising a member having an axially transverse slot on one of them and a headed member on the other of them adapted to slide in said slot for disconnection.

4. A selector valve mechanism for a thermochemical surface conditioning apparatus comprising in combination a cylinder, longitudinally spaced passages connected to said cylinder, a piston movable in said cylinder for the control of fluid flow through said passages, a slidable rod actuating said piston through an end of said cylinder, a detachable connection between said rod and piston, and a detachable gas pipe connection at the end of the cylinder away from that through which said rod is movable, the pipe connection at such end of said cylinder being removable and the piston being movable out of that end of the cylinder, the piston being movable laterally of its axis for disconnection from its actuating rod for inspection and replacement, said rod having a slidable bearing in said cylinder adjacent said detachable connection and a roller bearing support for the rod beyond said cylinder.

5. A selector valve mechanism for a thermochemical surface conditioning apparatus comprising in combination at least one cylinder, a piston in said cylinder, an actuating rod for said piston, longitudinally spaced passages from said cylinder for the control of fluid through the passages by the position of the piston in said cylinder, a stationary support for an end of said cylinder, bearings for said rod adjacent said support, one bearing being of the anti-friction type and one including an enlarged end portion for said rod slidably bearing within said cylinder and supporting the rod end, rack teeth adjacent the anti-friction supported end portion of said rod, and an actuating pinion engaging said rack teeth for shifting its enlarged end and said piston to uncover successively spaced passages.

6. A selector valve mechanism in an apparatus for thermochemically conditioning the surface of billets and the like comprising a cylinder, means for supplying gas under pressure to an end portion of said cylinder, a piston therein for covering and uncovering longitudinally arranged ports in said cylinder, said piston comprising a body portion, a deformable packing ring carried by the body portion for engaging the cylinder, and another ring between the first mentioned ring and the gas pressure end of the piston, said second mentioned ring comprising a self-lubricating carbon ring, and yieldable means cooperating with said second ring and piston body portion for pushing such ring radially outwardly into contact with the cylinder whereby the piston is lubricated against sticking and the second ring is adapted to shield the first ring against any backfire flame.

7. A selector valve mechanism for thermochemical surface conditioning apparatus comprising a cylinder, means for supplying gas under pressure to one end portion of said cylinder, a plurality of passages longitudinally spaced and connected to said cylinder, a piston in said cylinder for admitting the flow of gas to some of said passages according to the longitudinal position of the piston in said cylinder, an actuating rod for said piston, bearings for said rod, one of said bearings being slidable within said cylinder in addition to said piston, and an expansible self-lubricating carbon ring carried by said piston capable of lubricating both the piston and said rod bearing.

8. A piston for an oxygen containing cylinder, said piston having an oil-less, self-lubricating, outwardly expansible piston ring in combination with a deformable sealing ring on a reduced pressure side of the first-mentioned ring whereby the second mentioned ring is protected from a backfire flame by the first mentioned ring, said first mentioned ring being of carbon impregnated with a metal to enhance its life and wear resisting character.

9. In a desurfacing machine having nozzle selector mechanism including a piston slidable in a cylinder to block off certain nozzles from the supply of gas thereto, said piston comprising a pair of chevron shaped packing rings, and a self-lubricating packing ring of trapezoidal cross section on the pressure side of said pair of rings, the outer surface of said last ring being wider than its inner surface, and yieldable means for gripping at least one side of all three packing rings.

10. In a desurfacing machine having nozzle selector mechanism including a piston slidable in a cylinder to block off certain nozzles from the supply of gas thereto, a gas supply passage for an end of said cylinder, a detachable connection between said passage and cylinder, mechanism for sliding said piston along said cylinder beyond its supply end, a quick detachable connection between said piston and said mechanism comprising a head slidable in a slot extending at right angles to the axis of said piston and cylinder whereby upon removal of the gas supply passage from the end of the cylinder the piston may be moved out of the cylinder and disconnected from its mechanism for replacement.

11. A selector valve mechanism for a thermo-chemical surface conditioning apparatus comprising in combination at least a pair of cylinders, longitudinally arranged outlets from each cylinder, a piston in each cylinder for controlling the outlets from each cylinder, an inlet for fuel gas under pressure connected to one cylinder, an inlet for oxygen under pressure connected to another cylinder, an enclosure on the low pressure side of each piston, a rotatable shaft extending through each enclosure, a bearing for said shaft between the enclosures on the low pressure side of the fuel gas piston and oxygen piston, vent means for the enclosure beyond the fuel gas piston, and a slot being provided in said bearing connected with the atmosphere whereby if said vent means becomes clogged, leakage of gas through said bearing may be to the atmosphere instead of forming an explosive mixture in either enclosure.

12. Mechanism according to claim 6 in which said second mentioned packing ring of carbon is impregnated with cadmium.

13. In a selector mechanism for use with surface conditioning apparatus, at least two cylindrical chambers severally constructed for connection to a source of oxygen under pressure and to a source of fuel gas under pressure, each of said chambers having a longitudinal row of gas discharge ports constructed to deliver gas from said chambers, a plurality of pistons, one in each of said chambers and movable longitudinally thereof to control the flow of gas from said chambers through a predetermined and variable number of discharge ports thereof, means for moving each piston lengthwise of its chamber, such moving means comprising a rack connected to each piston, a gear adjacent the end of each chamber opposite the supply end thereof and meshing with each rack, means for rotating said gears, housing means enclosing said racks and said gears and secured to and communicating with an end of each of said chambers, said housing means including partition means constructed to provide a separate compartment for two meshing racks and gears, and said means for rotating said gears comprising a single shaft extending into said housing means and through said partition means and keyed to said gears, said housing means and partition means together with said shaft extending through said partion means being constructed to isolate said chambers from one another in case of leakage of gas through the partition means around said shaft.

14. A piston having an expansible carbon ring adapted to lubricate the piston movement in the cylinder and constructed to resist backfire flame from the pressure side of said piston, and at least two more pliable rings of packing material on the low pressure side of said carbon ring, said pliable rings being each of T-shaped cross section and having on each side of the stem of the T, retaining rings of plastic material harder than said packing material.

15. In apparatus hot metal desurfacing comprising a selective valve mechanism including cylinders and pistons controlling a number of gas supply lines and including a pair of adjacent enclosures into each of which gas may leak past one of said pistons and through both of which a shaft extends, one of such enclosures being adjacent an oxidizing gas cylinder and the other adjacent a fuel gas cylinder, and a bearing for said shaft between said enclosures to prevent intermixture of said gases, the combination therewith of the improvement for reducing the danger of an explosive mixture being formed in one enclosure by leakage of gas from an adjacent enclosure through said bearing between the enclosures, said improvement including said bearing therebetween being comprised of two spaced parts with an air vent between said parts and between said enclosures and around said shaft between the two portions of said bearing, whereby any gas leakage from one enclosure through one bearing portion escapes into the atmosphere without danger of it passing into the other enclosure.

16. Hot metal desurfacing apparatus according to claim 15 in which a gas supply is connected to each cylinder on its side remote from said enclosures, each piston having a self-lubricating ring and a deformable packing ring, said self-lubricating ring being located on the side of the piston adjacent the gas supply to said cylinder and the deformable packing ring being on the side of the piston adjacent said enclosure, whereby, in event of a backfire, the self-lubricating ring may protect the deformable packing ring, and whereby, in event of gas leakage past said pistons and through said bearing portions, no explosive mixture will be formed in either enclosure.

ALFRED J. MILLER.
WILLIAM C. WEIDNER.
JOHN KOLODY.

REFERENCES CITED

The following references are of record in the file of this patent:

UNITED STATES PATENTS

| Number | Name | Date |
|---|---|---|
| 382,524 | Granger | May 8, 1888 |
| 832,178 | Weinland | Oct. 2, 1906 |
| 1,256,759 | Wilson | Feb. 19, 1918 |
| 1,304,409 | Thompson | May 20, 1919 |
| 1,814,762 | Mochel | July 14, 1931 |
| 1,920,949 | Hermann | Aug. 1, 1933 |
| 2,060,335 | Muchnic | Nov. 10, 1936 |
| 2,092,086 | Saharoff | Sept. 7, 1937 |
| 2,349,170 | Jackman | May 16, 1944 |
| 2,392,806 | Buckman | Jan. 15, 1946 |

FOREIGN PATENTS

| Number | Country | Date |
|---|---|---|
| 23,136 | Great Britain | of 1913 |
| 353,874 | Italy | Nov. 2, 1937 |